April 23, 1963     E. J. DAVIS     3,086,359
INTEGRAL NOZZLE SEPARATOR FOR A MULTI-STAGE REACTION MOTOR
Filed July 19, 1960
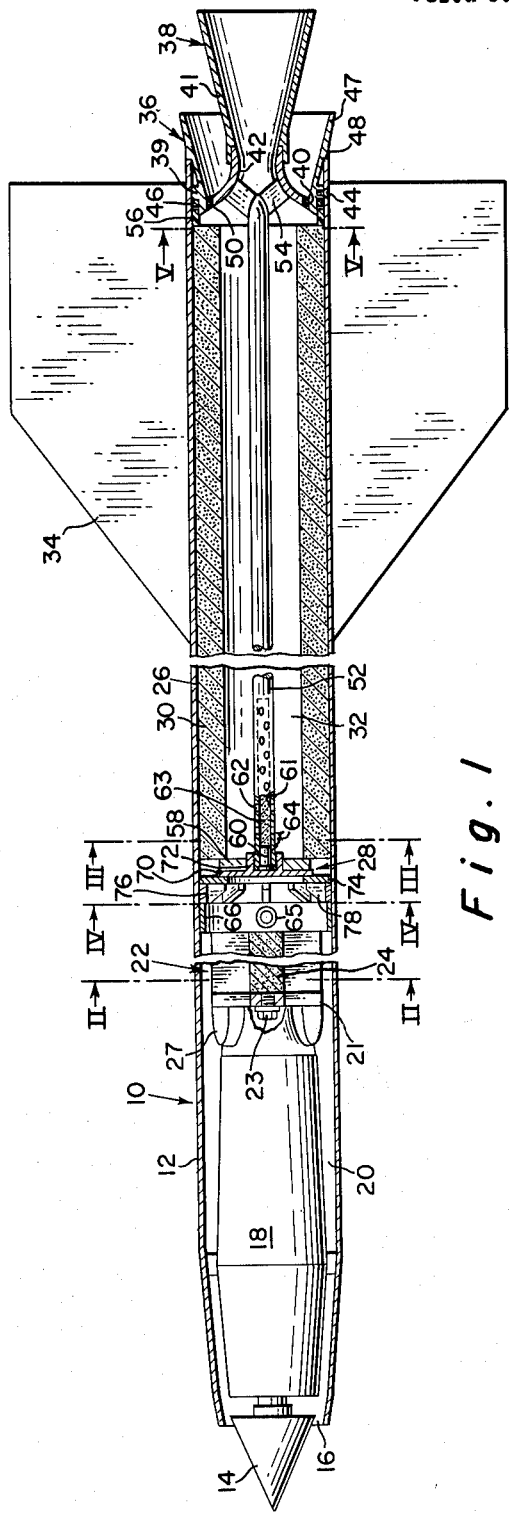
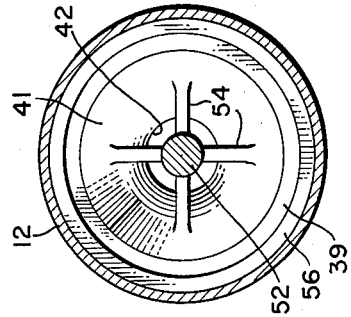
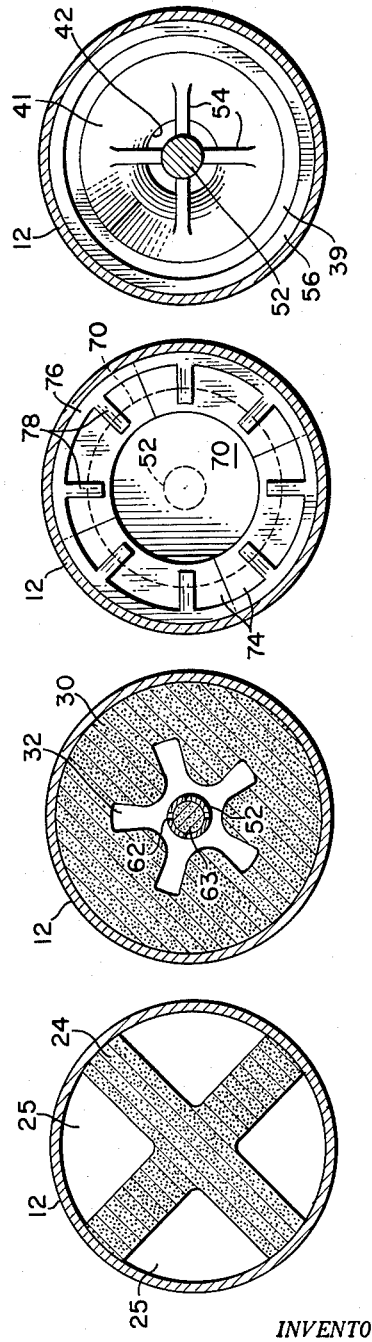
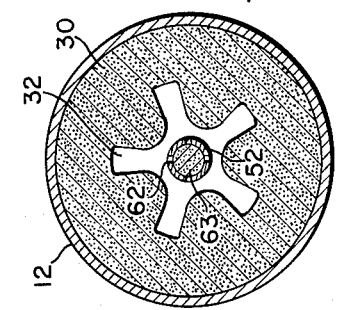
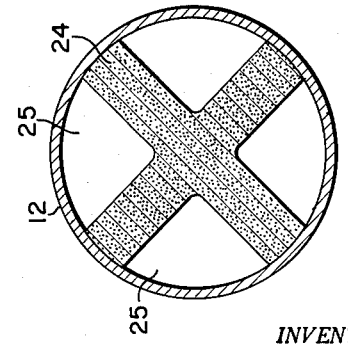
INVENTOR.
EDWARD JAMES DAVIS
BY
ATTORNEY 3,086,359
INTEGRAL NOZZLE SEPARATOR FOR A MULTI-STAGE REACTION MOTOR
Edward James Davis, Granada Hills, Calif., assignor to the United States of America as represented by the Secretary of the Navy
Filed July 19, 1960, Ser. No. 43,966
7 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to reaction motors and, more particularly, to such motors having a plurality of stages and a plurality of nozzles.

The art of missile propulsion has recently advanced to the stage wherein the heretofore external rocket booster motor has been incorporated within the missile in association with another rocket motor or a ram jet motor. There are several advantages of such an arrangement; namely, optimum missile weight and configuration are more closely approximated; a common combustion chamber for the ram jet and rocket motors is possible because the motors are successively operated; and the rocket motor can be utilized to preheat the ram jet fuel.

To permit efficient operation of both the rocket motor and the ram jet motor, each motor must be provided with a separate nozzle having throats of different diameters. Since operation of the ram jet motor requires a large nozzle throat diameter, and the rocket motor requires a smaller diameter nozzle, some provision must be made to dispose of the smaller nozzle at the end of the rocket motor operation to permit unrestricted ram jet operation.

One means proposed for accomplishing this result is to construct a rocket nozzle of a consumable material that will burn out at the end of rocket booster motor operation. This solution has been found in practice to be unreliable and inefficient.

Another device for accomplishing this result includes a rocket nozzle that is spring-retained in an operable position within the ram jet nozzle, the rocket nozzle being released and ejected at the end of rocket booster motor operation. The release time for this type of ejectable nozzle was determined by a normal force on a friction surface. This surface being unpredictable made it difficult to release the rocket nozzle at the proper moment in the sequence of operation; namely, before the ram jet motor is operated.

In addition to separate nozzles, some provision must also be made for separating the rocket motor from the ram jet motor during operation of the former, and for releasing the separator to permit subsequent operation of the jet motor.

The present invention overcomes the disadvantages of the prior art devices by constructing a rocket nozzle that is integral with a separator between the rocket booster motor and the ram jet motor. The assembly of rocket nozzle and separator is maintained within the missile by rocket motor gas pressure, and at burnout of the rocket grain the entire assembly is ejected to initiate ram jet motor operation. In the preferred embodiment, the rocket motor nozzle is mounted within and concentric with the ram jet nozzle. The rocket motor nozzle is connected to the separator by means of a rod which also can serve to house the rocket booster ignitor and as a resonator. A principal object is to provide a multi-stage reaction motor having greater reliability and efficiency.

Another object of this invention is to provide a multi-stage reaction motor with a plurality of nozzles, and having a motor separator and one of the nozzles constructed as an integral assembly.

A further object is to provide such an assembly which is maintained in operative position by rocket gas pressure, and ejectable at the end of rocket motor operation by gas pressure.

A still further object is to provide a motor separator that has improved sealing during rocket motor operation, and which is collapsible for ejection.

Other objects and many of the attendant advantages of this invention will be readily appreciated as the same become better understood by reference to the following detailed description when considered in connection with the accompanying drawings wherein:

FIG. 1 is a longitudinal side elevation view of one type of an air launched guided missile, partially in section, showing combined rocket-ram jet motors having the integral assembly of rocket nozzle and motor separator according to the teaching of this invention;

FIG. 2 is an enlarged transverse cross-section of the missile body taken through the ram jet motor along line II—II showing the ram jet grain configuration;

FIG. 3 is an enlarged transverse cross-section of the missile body taken through the rocket booster motor along line III—III, showing the rocket booster grain configuration;

FIG. 4 is an enlarged transverse cross-section of the missile body taken along line IV—IV showing the details of the motor separator; and FIG. 5 is an enlarged transverse cross-section of the missile body taken along line V—V showing the nested arrangement of the nozzles.

Referring to the drawing where like reference numerals refer to similar parts throughout the figures, there is shown in FIG. 1 one type of air-launched, multi-reaction motor powered missile 10 on which the instant invention can be employed, the particular embodiment employing combined rocket ram-jet motors. Missile 10 comprises generally an outer hollow cylindrical body 12 having at a forward end a diffuser 14 concentrically spaced from the body to form a ram air inlet 16. Diffuser 14 is attached to an inner cylindrical body 18 which may provide a housing for electronic components, the inner body being supported within and concentrically spaced from outer body 12 to provide an annular longitudinal ram air passage 20 leading to a ram jet motor 22 located intermediate the missile ends. Diffuser 14 is a device for conveying the ram air into the combustion chamber of the missile while reducing its velocity and increasing its static pressure. As shown in FIG. 2 ram jet motor 22 may comprise a solid propellant grain 24 which may be an external burning type having a cruciform cross-sectional configuration in which longitudinal spaces 25 form ram air passages. For the purpose of this invention, the jet motor could be of a liquid or solid propellant type or could be another rocket motor as will be later described.

Ram jet grain 24 is supported at the forward end by an integral inert plate 21 attached by a bolt 23 to a transition piece 27 the latter converting the annular flow of air in passage 20 into four equal paths for flow through the cruciform grain.

A rocket booster motor 26 is mounted within missile body 12 at the aft end in an in-line relation to ram jet motor 20. The motors are transversely blocked by a separator assembly 28, which functions to seal the rocket motor from the ram jet motor during the boost phase and will be described later in greater detail. Rocket motor 26 comprises a solid propellant grain 30 having a hollow core 32 being of the internal burning type, as shown in FIG. 3. It is obvious that the configuration of both the ram jet and rocket propellant grain can be varied.

Mounted on the boattail of missile 10 are a plurality of conventional fins 34 for providing missile stability in flight. Within the aft end of the missile body are mounted a pair of concentric outer and inner nozzles 36 and 38, respectively. Outer nozzle 36 is operatively associated with ram jet motor 22 and has a body portion 39 with a throat diameter 40. Inner nozzle 38 is operatively associated with rocket motor 26 and has a body portion 41 with a smaller diameter throat 42.

Ram jet nozzle 36 is secured within the missile body by a plurality of circumferential spaced screws 44 extending through the missile body into the body portion 39 of the nozzle. An O-ring 46 is housed in the nozzle body 39 to engage the inner wall of missile body 10 and provides a suitable gas seal. The outer wall of the bell portion 47 of the nozzle is provided with an annular shoulder 48 adapted to abut the end of the missile body.

Nozzle body 41 is concentrically supported within the larger diameter throat 40 of the outer ram jet nozzle and is sealed therein by an O-ring 50 preferably housed in body 41. Inner nozzle 38 is longitudinally supported in the nested position, with the leading edges of the nozzles faired, by a central rod 52 connected at the aft end by a spider formed of plurality of radially-spaced webs 54 (see FIG. 5). The forward end of rod 52 is attached to motor separator assembly 28. Rod 52 extends freely through core 32 of rocket grain 30, which grain is positioned between separator assembly 28 and ram jet nozzle 36 and maintains inner rocket nozzle 38 in the correctly aligned position within outer ram jet nozzle 36. An obdurating silicone rubber ring 56 and a fiber felt pad 58 interposed between the ends of propellant grain 30 and ram jet nozzle 36 and separator assembly 28, respectively, snugly and resiliently engage the grain ends to absorb and dampen any shock that might otherwise damage the grain.

A rocket ignitor 60 is conveniently housed in a portion of a forward hollow end 61 of rod 52, the remaining portion of the hollow end having staggered holes 62 and filled with ignition material 63 for distributing the flame to the propellant grain. Ignitor 60 is electrically connected to a suitable ignition circuit by a conductor 64 which conductor may extend along core 32 of the grain or otherwise be connected to the missile exterior. For example, rocket grain 30 could be ignited like the ram jet grain by a ram jet ignitor 65 supported on ring 66 and extending into the missile body normal to the longitudinal axis. In addition to the above-described functions, rod 52 also functions as a resonance rod for the rocket motor as defined in Rocket Encyclopedia Illustrated, Aero Publishers, Inc. 1959, a resonance rod is a combustion stabilization device of non-burning material that is mounted at the center of the axial hole in an internal-burning solid-propellant grain. The resonance rod smooths out pressure oscillations, which is believed to be caused by an acoustical phenomena, that otherwise results in unstable combustion.

Separator 28 comprises a central circular plate 70 having a hub portion 72 threadedly receiving rod 52 at the ignitor end. The diameter of plate 70 must of necessity be smaller than throat diameter 40 of the ram jet nozzle to permit plate 70 to be ejected unrestrictedly therethrough at the end of rocket motor operation. Plate 70 in combination with a larger segmented annular ring 74 extends throughout the inner diameter of missile body 12 and functions to seal the gas pressure generated in the rocket booster motor from the ram jet motor during rocket motor operation; that is, during the boost phase of the missile flight. Annular ring 74 is segmented into four sections (more or less) to permit collapse and individual ejection of the sections through nozzle 36 and after plate 70. Annular ring 74 is supported rearwardly by plate 70, and forwardly by a turbulence ring 76, the latter being spot welded along its periphery or otherwise secured within the missile body. Ring 76 has a plurality of spaced radial dogs 78 extending inwardly from the periphery, about the same distance as the width of annular ring 74 to serve as a back-up for ring 74. The dogs serve also to create turbulence in the ram air flow and, thus, improve combustion efficiency as described in the Rocket Encyclopedia Illustrated, ibid. To facilitate assembly of motor separator parts into the missile body, and for sealing purposes, plate 70 and ring 74 may be coated on engaging surfaces with a sealing compound, such as silicone rubber, which sealing compound may also be applied between rings 74 and 76.

Upon ignition of the ignitor 60, the boost phase of the missile flight is initiated. The burning of rocket booster grain 30 develops a gas pressure in the rocket chamber which in one design amounts to about 1500 p.s.i. The boost pressure will cause a resultant force in a forward direction, taking into consideration the differential effective areas on the respective ends of the integral separator-booster assembly and also the ram air pressure, sufficient to hold the rocket booster nozzle in the normal operative position (as shown in FIG. 1), with separator 28 sealing the opening in the missile body between the rocket and ram jet motors.

Upon burn-out of rocket grain 30, boost pressure in the chamber, as well as the oppositely directed forces at both ends therefrom, drops to zero. The only remaining force acting on separator 28 is the rearwardly directed ram air pressure which force ejects as an assembly the integrated separator rod 52, and booster nozzle 38 through throat 40 of the fixed ram jet nozzle 36. Annular ring 74 falls apart into the segments which parts are also discharged through the ram jet nozzle throat.

It has been found in practice that during the final burning of the rocket grain, the decay of pressure is greater at the separator end over the nozzle end resulting in a rearward force that tends to eject the assembly apart from, but in addition to, the ram air. Likewise where motor 22 is a rocket motor not depending on ram air, the gas pressure generated by ignition of the rocket may serve to eject the separator nozzle assembly. As the separator-nozzle assembly is ejected, ram jet motor 22 is initiated by a suitable means through its ignitor 65, and the missile commences the ram jet phase of missile flight. The dogs 78 of turbulence ring being fixed within the missile body create turbulence of the ram air as it passes through the rocket booster chamber which, being now void of the rocket grain, forms a combustion chamber for the ram jet motor operation.

The separator-rocket booster nozzle of this invention provides a simple and inexpensive construction for integrating and accomplishing the combined functions of separating the reaction motors and providing a disposable booster nozzle. By providing a construction which lies completely within the missile body, there are no protruding surfaces that might affect the otherwise smooth aerodynamic airfoil of the missile. The integral separator-nozzle assembly is maintained in position by rocket booster chamber pressure without resorting to springs, friction, etc. In addition, ejection of the assembly materially reduces the missile load during the subsequent or jet motor phase of operation. The rod connecting the separator and the nozzle serves other functions; namely, to provide a housing for the booster ignitor and as a resonance rod.

Obviously many modifications and variations of the present invention are possible in the light of the above teachings. It is therefore to be understood that within the scope of the appended claims the invention may be practiced otherwise than as specifically described.

I claim:
1. A multi-stage missile comprising a single hollow missile body having an exhaust outlet at the trailing edge, means for separating said body into a forward section and an aft section, said forward section supporting a forward motor, said aft section supporting an aft motor being the first motor to be ignited, said aft motor having a nozzle concentrically supported within the outlet and nested therein, and means extending through the aft motor for connecting the separating means to the nozzle, said separating means being collapsible into a size smaller than said exhaust outlet whereby said separating means, connecting means and nozzle can pass through and be ejected from the aft section through the exhaust opening.

2. A combined ram jet and rocket engine comprising a single hollow missile body providing an air inlet in the forward end and an exhaust outlet in the trailing end, means for separating said body into a forward section and an aft section, said separating means capable of blocking the admission of ram air into the aft section, a ram jet motor supported in the forward section, a rocket motor supported in the aft section, said ram jet motor having a nozzle supported within the outlet, said rocket motor having a nozzle concentrically supported within the ram jet nozzle and nested therein, and means extending through the rocket motor for connecting the separating means and the rocket motor nozzle into an assembly, said separating means being collapsible to a size smaller than the ram jet motor nozzle; whereby upon burn-out of the rocket motor the assembly is ejected through the ram jet motor nozzle by the differential pressure on both sides of the separating means.

3. The apparatus of claim 2 wherein said connecting means comprises a rod to provide an integral assembly, said rod capable of breaking up resonance waves that may be generated in the rocket motor during burning.

4. The apparatus of claim 3 wherein said rod is hollow at one end to house an ignitor for said rocket motor.

5. The apparatus of claim 2 wherein said separating means comprises an outer segmented ring having a central opening and a plate, said plate being of a size to block said opening and capable of passing through the rocket nozzle, said plate being attached to the connecting means.

6. A combined ram jet and rocket engine comprising a single hollow missile body providing an air inlet in the forward end and an exhaust opening in the trailing end, means for separating said body into a forward section and an aft section, said separating means capable of blocking the admission of ram air into the aft section, a ram jet motor supported in the forward section, a solid propellant rocket motor supported in the aft section, said ram jet motor having a nozzle supported within the outlet, said rocket motor having a nozzle concentrically supported within the ram jet nozzle and nested therein, a band secured within said body and having a plurality of radially extending dogs, said separating means comprising a collapsible segmented ring having a central opening and a plate of a size to block said opening, rod means connecting said plate to the rocket motor nozzle to form an integral assembly of a size capable of passing through said rocket motor nozzle whereby upon burn-out of the rocket motor, the segmented ring collapses and is ejected with said assembly through the rocket motor nozzle.

7. The apparatus of claim 6 wherein a resilient pad is clamped between the solid propellant and the separating means.

References Cited in the file of this patent

UNITED STATES PATENTS

| | | |
|---|---|---|
| 2,644,396 | Billman | July 7, 1953 |
| 2,724,237 | Hickman | Nov. 22, 1955 |
| 2,829,491 | Teague | Apr. 8, 1958 |
| 2,912,820 | Whitmore | Nov. 17, 1959 |
| 2,974,478 | Sweet et al. | Mar. 14, 1961 |
| 2,987,875 | Fox | June 13, 1961 |
| 2,990,684 | Cohen | July 4, 1961 |
| 3,040,517 | Ryden et al. | June 26, 1962 |

FOREIGN PATENTS

| | | |
|---|---|---|
| S 45,089 | Germany XL/62b | printed Sept. 20, 1956 |